United States Patent [19]
Brown et al.

[11] Patent Number: 5,963,310
[45] Date of Patent: Oct. 5, 1999

[54] SURFACE IMAGING SKIN FRICTION INSTRUMENT AND METHOD

[75] Inventors: James L. Brown, Cupertino; Jonathan W. Naughton, San Jose, both of Calif.

[73] Assignee: The United States of America as represented by the Administrator of the National Aeronautics and Space Administration, Washington, D.C.

[21] Appl. No.: 08/873,352

[22] Filed: Jun. 11, 1997

[51] Int. Cl.[6] ........................................... G01B 9/02
[52] U.S. Cl. .......................... 356/35.5; 356/347
[58] Field of Search .................... 356/361, 345, 356/347, 35.5; 73/800

[56] References Cited

U.S. PATENT DOCUMENTS

| 4,377,343 | 3/1983 | Monson | 356/357 |
|---|---|---|---|
| 5,178,004 | 1/1993 | Bandyopadhyay et al. | |

OTHER PUBLICATIONS

Reda, D.C., Muratore, J.J. Jr., Heineck, J.T., "Time and Flow–Direction Responses of Shear–Stress–Sensitive Liquid Crystal Coatings," AIAA Journal, vol. 32, No. 4, 1994, pp. 693–700).

Winter, K.G., "An Outline of the Techniques Available for the Measurement of Skin Friction in Turbulent Boundary Layers," Progress in Aeronautical Sciences, vol. 18, 1977, pp. 1–57.

Settles, G.S., "Recent Skin Friction Techniques for Compressible Flows," AIAA paper 86–1099, May, 1986.

Tanner, L. H. and Blows, L. G., "A Study of the Motion of Oil Films on Surfaces in Air Flow, with Application to the Measurement of Skin Friction", Journal of Physics E: Scientific Instrumentation, vol. 9, pp. 194–202, 1976.

Tanner, L.H., "A Skin Friction Meter, Using the Viscosity Balance Principle, Suitable for Use with Flat or Curved Metal Surfaces," Journal of Physics E: Scientific Instrumentation, vol. 10, pp. 278–284, 1977.

Tanner, L.H., "A Comparison of the Viscosity Balance and Preston Tube Methods of Sin Friction Measurement," Journal of Physics E: Scientific Instrumentation, vol. 10, pp. 627–632, 1977.

Tanner, L.H. and Kulkarni, V.G., "The Viscosity Balance Method of Skin Friction Measurement: Further Developments including Applications to Three–Dimensional Flow," Journal of Physics E: Scientific Instruments, vol. 9, 1976, pp. 1114–1121.

Monson D.J., Mateer, G.G., and Menter, F.R., "Boundary–Layer Transition and Global Skin Friction Measurement with an Oil–Fringe Imaging Technique" SAE Paper No. 932550, Sep., 1993.

Squire, L.C. in "The Motion of a Thin Oil Sheet Under the Boundary Layer on a Body", Flow Visualization in Wind Tunnels Using Indicators, compiled by R.L. Maltby, AGARDograph 70, Apr. 1962, pp. 7–23.

Bendat, J.S. and Piersol, A.G. "Random Data: Analysis and Measurement Procedures" 2nd Edition, John Wiley and Sons, New York, 1986, pp. 484–516).

Naughton, J.W. and Brown, J.L., "Surface Interferometric Skin–Friction Measurement Technique", AIAA paper 96–2183, Jun. 17–20, 1996.

*Primary Examiner*—Frank G. Font
*Assistant Examiner*—Tu T. Nguyen
*Attorney, Agent, or Firm*—Kenneth L. Warsh; Harry Lupuloff; John G. Mannix

[57] ABSTRACT

A surface imaging skin friction instrument allowing 2D resolution of spatial image by a 2D Hilbert transform and 2D inverse thin-oil film solver, providing an innovation over prior art single point approaches. Incoherent, monochromatic light source can be used. The invention provides accurate, easy to use, economical measurement of larger regions of surface shear stress in a single test.

30 Claims, 8 Drawing Sheets

SURFACE IMAGING SKIN FRICTION INSTRUMENT AND METHOD

ORIGIN OF INVENTION

The invention described herein was made in the performance of work under a NASA contract and is subject to the provision of Section 305 of the National Aeronautics and Space Act of 1958, Public Law 85–568 (72 Stat. 435; 42 U.S.C. 2457).

BACKGROUND OF THE INVENTION

1. Technical Field of the Invention

The present invention relates in general to the field of wall shear stress or skin friction measurement. The invention relates in particular to a new instrument for the accurate measurement of skin friction on a model or a body subjected to an air flow or a body subjected to a fluid flow. More specifically, the instrument of the present invention enables the determination over large regions of two-dimensional (2D) wall shear stress vectors acting on a surface which bounds a three-dimensional (3D) fluid flow.

2. Description of the Prior Art

Numerous commonly used devices such as aircraft, automobiles, pumps, turbines, etc., involve a three-dimensional fluid flow bounded by solid surfaces. The performance of these devices is predominately determined by the pressure normal stress and the wall shear stresses generated by the fluid flow, which act on the solid surfaces. As an example, lift and drag forces act on a commercial aircraft at transonic cruise conditions. The lift force counteracts gravity and allows the aircraft to fly, while the drag force must be countered by the propulsion system which consumes fuel.

The lift force is predominately generated by the wall pressure acting on the aircraft surfaces (e.g., wings, etc.) and the drag force is generated by a combination of the wall pressure and the wall shear stress acting on the aircraft surfaces (e.g., wings, tail and fuselage, etc.). Typically, about one-half of the drag of such a commercial aircraft at transonic cruise can be attributed directly to the wall shear stresses. Since considerable fuel is consumed to provide propulsion to overcome this drag force, it is clear that the wall shear stress has an important impact on the economics of the aircraft industry. Further, the extensive measurement of the wall shear stress can result in a better understanding of aerodynamic technology upon which aircraft designs are based.

The wall shear stress ($\tau_x(x,z)$ and $\tau_z(x,z)$) is a vector which lies in the plane of the surface, and which may vary over the surface. The wall shear stress signifies a force per unit area applied to the surface by the flow of a fluid over that surface. In contrast, the wall pressure, $P(x, z)$, is a scalar quantity which may vary over a surface, and signifies the force per unit area applied normal to the surface by the fluid immediately adjacent to the surface.

There exists a variety of techniques for measuring wall shear stress. Some of these conventional techniques include Preston tubes, surface fences, surface balances, surface hot films, log-law analysis of velocity profiles, liquid crystal (Reda, D. C., Muratore, J. J. Jr., Heineck, J. T., "Time and Flow-Direction Responses of Shear-Stress-Sensitive Liquid Crystal Coatings," AIAA Journal, vol. 32, no. 4, 1994, pp. 693–700) and oil film interferometry. For a more complete review of existing wall shear stress measurement techniques reference is made to Winter, K. G., "An Outline of the Techniques Available for the Measurement of Skin Friction in Turbulent Boundary Layers," Progress in Aeronautical Sciences, vol. 18, 1977, pp. 1–57; and Settles, G. S., "Recent Skin Friction Techniques for Compressible Flows," AIAA paper 86–1099, May, 1986.

Existing instruments include inherent limitations that prevent extensive use in a wind-tunnel or flight test environment. Most of these instruments, such as Preston tube, surface fence, surface balance, hot films and the log-law velocity profile analysis, allow for only a measurement at a single point on the surface. Further, the direction of the wall shear stress vector must be known, for instance from a surface oil-flow visualization where dots of oil are placed on the surface and are allowed to flow in the direction of the local wall shear stress.

The liquid crystal technique provides measurement of wall shear stress magnitude and direction but the theory behind this instrument is not rigorous and requires a complicated in-situ calibration process using another wall shear stress instrument.

Prior forms of the oil film interferometer wall shear stress instruments provided only measurements of wall shear stress at a point or along a line of oil, and the direction of the wall shear stress was needed either apriori or from another technique. Such limitations meant that wind-tunnel and flight test programs to develop aircraft designs do not benefit from extensive wall shear stress measurements. These measurements serve to improve lower drag designs.

Tanner, L. H. and Blows, L. G., "A Study of the Motion of Oil Films on Surfaces in Air Flow, with Application to the Measurement of Skin Friction", Journal of Physics E: Scientific Instrumentation, vol. 9, pp 194–202, 1976; Tanner, L. H., "A Skin Friction Meter, Using the Viscosity Balance Principle, Suitable for Use with Flat or Curved Metal Surfaces," Journal of Physics E: Scientific Instrumentation, vol. 10, pp 278–284, 1977; and Tanner, L. H., "A Comparison of the Viscosity Balance and Preston Tube Methods of Skin Friction Measurement," Journal of Physics E: Scientific Instrumentation, vol. 10, pp 627–632, 1977, describe the concept of the oil film interferometric measurement of wall shear stress. These articles present an instrument that measures the wall shear stress at a single point on a test surface. A thin straight line of oil is placed onto a test surface, approximately normal to the anticipated flow direction. The wind tunnel is started and air flows over the test surface. The oil flows in response to the wall shear stress imposed by the air flow. As a consequence of the oil flow, the oil film thickness decreases with time.

The thickness of the oil film at a single measurement point is determined optically using a low-power laser beam directed normal to the surface. Part of the incident light is reflected by the oil/air interface. Another portion of the incident light is reflected by the polished solid test surface. The two reflected light beams are imaged onto a photodetector. At the photodetector optical constructive/destructive interference between these two reflected beams occurs according to the difference in path length taken by each of the reflected beams. The time variation of the photodetector voltage output is recorded.

Constructive optical interference of the two optical reflections results in a local maximum in the photodetector voltage time history and occurs when the oil film has a thickness "h" that satisfies the following relation:

$$h = j\lambda/2n_0,$$

where "j" is an integer equal to 0, 1, 2, . . . ; "$\lambda$" is the wavelength of the light in vacuum; and "$n_0$" is the oil index of refraction.

Destructive optical interference of the two optical reflections results in a local minimum in the photodetector voltage time history and occurs when the oil film has a thickness "h" defined as follows:

$$h = +\tfrac{1}{2})\lambda/2n_0.$$

The thickness of the oil film is then deduced at discrete times when a local maximum or minimum occurs. Similarity analysis of the oil film flow may be made for an assumption of constant "X", resulting in the following similarity equation:

$$h = \mu x / \tau t,$$

where "x" is the distance from the oil line leading edge; "t" is the time from the start of the flow; "$\mu$" is the dynamic viscosity of the oil; and "$\tau$" is the shear stress component normal to the oil line leading edge.

The foregoing "Tanners and Blows" instrument has proven to be quite accurate, but is restricted to one measurement at a single point, and measures only the component of wall shear stress in the direction normal to the oil line leading edge.

Tanner, L. H. and Kulkarni, V. G., "The Viscosity Balance Method of Skin Friction Measurement: Further Developments including Applications to Three-Dimensional Flow," Journal of Physics E: Scientific Instruments, Vol 9, 1976, pp 1114–1121 presented an oil film interferometric method to measure the wall shear stress generated by a three-dimensional flow. This method analyzed the fringe pattern developed in individual drops of clear oil that were placed on the test surface. Analysis of a single interferogram image of the oil drop involved locating each discrete dark and light fringe, plotting the associated discrete heights (for each bright and dark fringe) along the drop centerline, and then analyzing by graphical integration along the drop centerline for the shear stress magnitude variation along the centerline of each drop according to the a generalization of the similarity relation:

$$\tau = \frac{2\mu}{\eta h^2} \int h\eta ds,$$

where, $\theta$ is the "streamline" spacing or spacing between oil dots, t is total flow time, and s is the distance along the oil drop centerline. It should be noted that Tanner and Kulkarni nomenclature use n rather than $\theta$, y rather than h, etc.

Much of the analysis which Tanner and Kulkarni described relied on "fortuitous polynomial fits". Also used was their "similarity" assumption, even for 3D, that dh/dx was proportional to 1/$\tau$. This method could result in the 3D shear stress vector but only for those discrete lines along which the oil drop would flow rather than continuously over the entire surface, used only the dark and bright fringes rather than each point (or camera pixel) of the entire image, made use of the approximation of the similarity relation rather than a more exact and rigorous treatment of the oil flow, and required a difficult and somewhat ambiguous determination of the surface streamline spacing.

Monson, in U.S. Pat. No. 4,377,343 introduce a dual-beam skin-friction interferometer which was a variant of the Tanners and Blow single-point instrument. The instrument provides for greater portability, ease-of-use, and alleviates the need to find the oil leading edge. However, only a single point measurement per wind tunnel run was measurable using the Monson instrument.

Bandyopadhyay et al. in U.S. Pat. No. 5,178,004 disclose a reflection type skin friction meter which relies upon measuring the slope of the oil-air interface rather than the thickness based on the similarity equation identified above. The Bandyopadhyay et al. skin friction meter uses a light beam and is basically a single point measurement system.

Monson, D. J., Mateer, G. G., and Menter, F. R., "Boundary-Layer Transition and Global Skin Friction Measurement with an Oil-Fringe Imaging Technique" SAE Paper No. 932550, September, 1993 describe an instrument referred to as the Fringe Imaging Skin Friction (FISF instrument). The FISF instrument relates to the holographic interferometric form of Tanner and Blow, but did not require a laser. A monochromatic light source was used instead of a laser, thus reducing safety requirements.

The FISF instrument provides measurement of the wall shear stress variation along the oil line. Only the component of the wall shear stress vector normal to the oil line leading edge is measured. The FISF instrument improvement over existing instruments resides in the ability to accomplish measurement for each point along the line during a single wind tunnel run, rather than taking measurement at a single point, thus considerably improving the efficiency of the instrument. However, the use of the similarity analysis for the derivation of the wall shear stress from oil film thickness reduces the accuracy of the results in particular for those regions of the surface where the direction of the wall shear stress varies.

Therefore, there is a significant and still unfulfilled need for a new oil film interferometer which addresses the foregoing limitations of existing instruments, and which enables a practical, simple, accurate, rapid measurement of the wall shear stress vector over large areas of an aerodynamic test surface.

SUMMARY OF THE INVENTION

Skin friction is important in many applications, as it is one of the primary quantities used in the determination of the aerodynamic performance of aircraft, automobiles and submarines. Nonetheless, the measurement of skin friction on a routine basis has never been realized. It is an object of the present invention to provide a unique surface imaging skin friction instrument that provides measurement of the wall shear stress vector, over a large surface region during a single wind tunnel test, using oil-film interference method.

During a test or run, a camera captures images of the fringe pattern produced by illuminating an oil film with quasi-monochromatic light. By using a visual tracer in the oil, the surface streamlines can also be determined. Analysis of the fringe images using advanced signal processing methods determines the oil height or thickness distribution in the region where fringes are visible. A combination of the oil height or thickness and surface streamline direction is then used to calculate the surface shear-stress distribution by numerically solving thin-oil film equations that have been specially developed for the present invention.

The first equation relates to a rigorous mathematical technique to solve partial differential equations which govern the flow of the thin-oil film in an inverse mode. Knowing the thickness of the oil, h(x, z, t), at two or more discrete times, the first equation is used to solve the applied wall shear stress vector ($\tau_x(x,z)$ and $\tau_z(x,z)$). Thus compared to conventional oil film techniques that make use of a similarity analysis of the oil film flow which is restricted to 1-D thin oil film flows, the instrument of the present invention achieves unprecedented results.

The second equation relates to a method for applying a phase object Hilbert transform technique to a two-dimensional (2D) phase object. The application of Hilbert transform technique allows for the analysis of the 2D optical interferometric fringe images (of the 2D surface) formed by the present instrument, to be analyzed for oil film thickness variation over the 2D surface in a continuous manner. Thus compared to conventional oil film techniques that are based on determining fringe peaks and valleys at discrete locations, the instrument of the present invention achieves significant improvements.

Yet an additional feature of the present invention is the combination of foregoing first and second equations for use in the present oil film skin friction instrument with significant practical improvements over conventional techniques.

BRIEF DESCRIPTION OF THE DRAWINGS

The above and other features of the present invention and the manner of attaining them, will become apparent, and the invention itself will be best understood, by reference to the following description and the accompanying drawings, wherein:

FIG. 5a depicts a camera light intensity function, e, along a line passing through the fringe pattern image of FIG. 3;

FIG. 5b depicts a windowed and filtered intensity function, f, corresponding to the function e of FIG. 5a, and the Hilbert transform, g, of the function f;

FIG. 5c depicts the phase function, $\psi$, derived from the functions f and g;

FIG. 5d depicts an unwrapped phase function, $\phi$, along the line passing through the fringe pattern image of FIG. 3; and FIG. 5e depicts the oil thickness along the line passing through the fringe pattern image of FIG. 3.

Similar numerals refer to similar elements in the drawings. It should be understood that the sizes of the different components in the figures are not necessarily to scale or in exact proportion, and are shown for visual clarity and for the purpose of explanation.

DETAILED DESCRIPTION OF THE INVENTION

Figure 1:
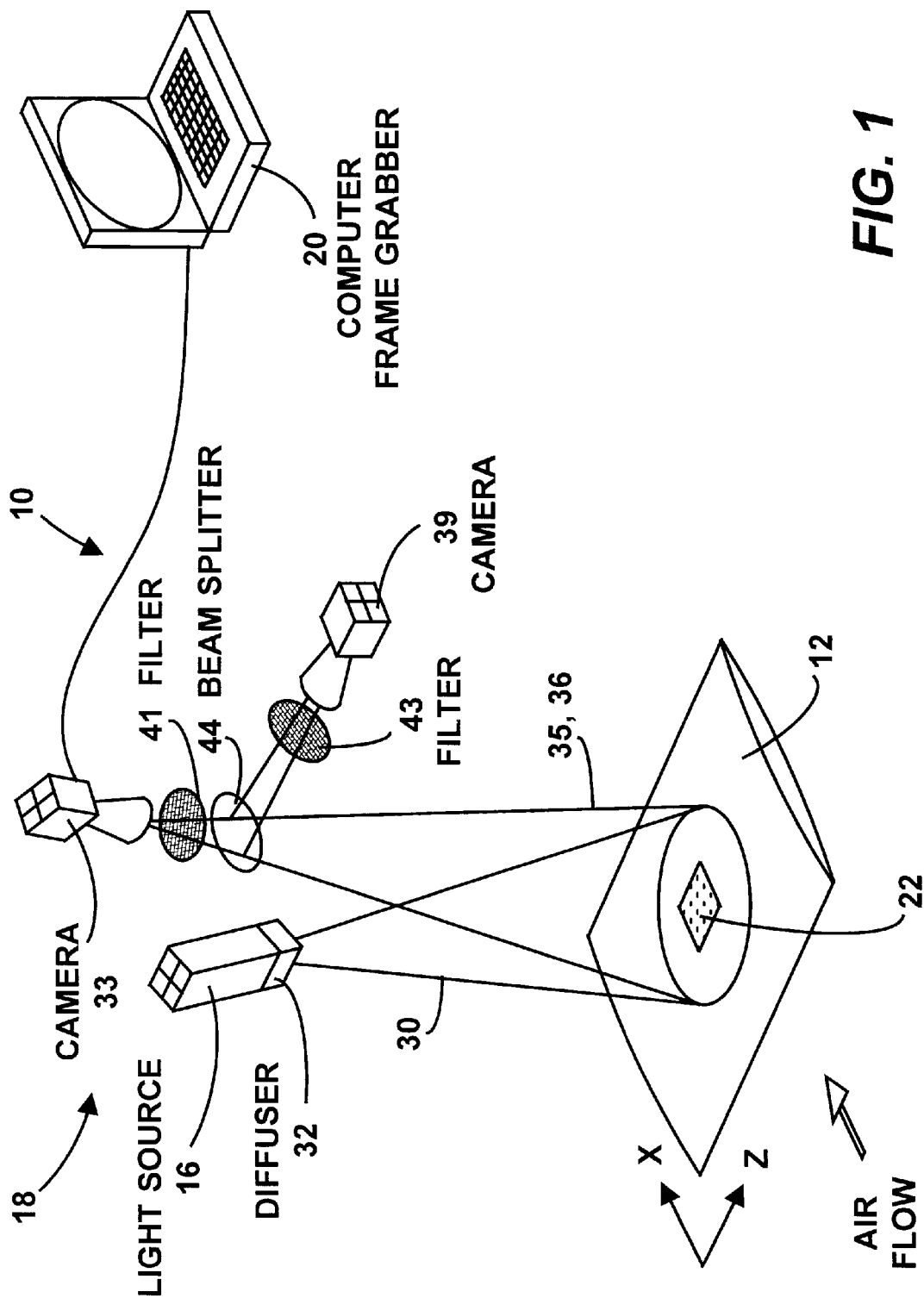
FIG. 1 is a schematic illustration of a surface imaging skin friction instrument shown in use during a wind tunnel test for measuring the wall shear stress vector over a large surface region according to the present invention.

FIG. 1 illustrates a surface imaging skin friction instrument 10 constructed according to the present invention and shown in use during a wind tunnel test for measuring the wall shear stress vector over a test surface 12. The instrument 10 generally includes a light source 16, an optical assembly 18 and a computer or processor 20.

Figure 2:
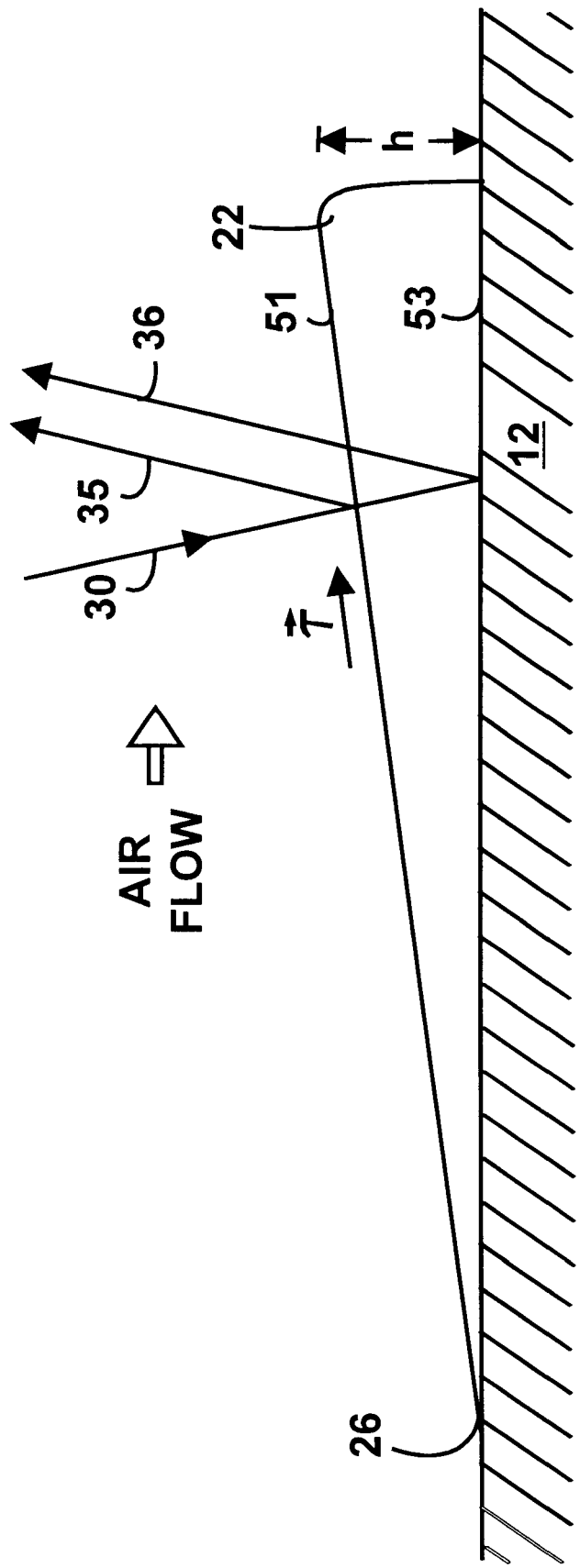
FIG. 2 is an schematic representation of an oil film on a surface, at a single point in time being acted upon by the shear stress due to a fluid flow above the surface and represents the type of oil film observed using the instrument in FIG. 1.

A thin film 22 of oil (or another appropriate viscous liquid immiscible in the fluid of the applied 3D flow) is placed or wiped onto the test surface 12. The initial thickness of the oil film 22 is not particularly important, but care is taken that a well-defined leading edge 26 of the oil film 22 is established (FIG. 2). The oil used is typically silicone oil which is calibrated for dynamic viscosity versus temperature $\mu(T)$.

The wind-tunnel run is started so that air flows over the test surface 12. In response to the wall shear stress generated on the test surface 12 by the air flow, the oil will flow and begin to thin. The thickness of the oil film 22 is governed by the following differential equation (1):

$$\delta h/\delta t + \delta(h^2 \tau_x/2\mu)/\delta x + \delta(h^2 \tau_z/2\mu)/\delta z = 0 \qquad (1)$$

subject to the following conditions:
h=0 at the leading edge 26, and
$h(x, z, t_0) = h_0(x, z)$ at the initial time $t_0$.

Squire, L. C. in "The Motion of a Thin Oil Sheet Under the Boundary Layer on a Body", Flow Visualization in Wind Tunnels Using Indicators, compiled by R. L. Maltby, AGARDograph 70, April 1962, pp. 7–23, has developed a similar equation governing the motion of a thin oil to theoretically evaluate the accuracy of traditional oil-flow techniques, and used to visualize the surface streamline patterns. Specifically, Squire addressed the effect of the oil on the boundary layer and the sensitivity of the oil-flow pattern to influences other than surface shear.

The light source 16 is turned on to generate an incident light beam 30 that impinges onto oil film 22. Using the optical assembly 18, two or more images are captured during the wind tunnel run, from which the oil thickness is determined. The time interval between two successive images is sufficiently long so as to allow for significant thinning of the oil.

In a preferred embodiment of the instrument 10, the light source 16 is monochrome (i.e., single-frequency) with coherence length greater than the anticipated thickness of the oil film 22. A light source with discrete optical spectral lines, such as a mercury lamp or a high-pressure sodium lamp may alternatively be used. A laser may also be used; however, the laser beam requires expansion and the coherent properties (extremely narrow spectral width and long coherence length—typically above several centimeters) of the laser light are not required. Typically, the light source 16 is extended, i.e., it is not a point light source, so that it may cover a substantial part of the oil film 22. To this end, a light diffuser screen 32 or painted tunnel walls, scatters the incident light beam 30 to provide an extended light source for the instrument 10.

The optical assembly 18 is preferably an interferometric imaging system as illustrated in FIG. 1, and includes a camera 33 that captures the reflected beams 35, 36. Optionally, additional optical components such as a second camera 39, two line filters 41, 43 and/or a beam splitter 44 may be added to enhance the output quality of the optical assembly 18.

As shown in FIG. 2, the incident light beam 30 is directed toward the test surface 12, upon which it impinges and is reflected into the two reflected beams 35, 36. The first beam 35 is reflected from the oil/air interface layer 51, while the second beam 36 is reflected from the oil/surface interface layer 53. The reflected beams 35, 36 are captured by the optical assembly 18 and combined at the image plane of the camera 33.

The camera 33 can be a CCD digital camera, a video camera or a film camera. The images captured by the camera 33 are then scanned or input into the computer 20 for analysis according to the present invention. The phase difference at the camera image plane of the two reflected beams 35,36 depends on the thickness of the oil film 22, and is expressed by the following equation (2):

$$\phi = 4\pi h\, n_0 / \lambda, \qquad (2)$$

where $\phi$ is the optical phase difference of the two reflected beams 35,36.

Figure 3:
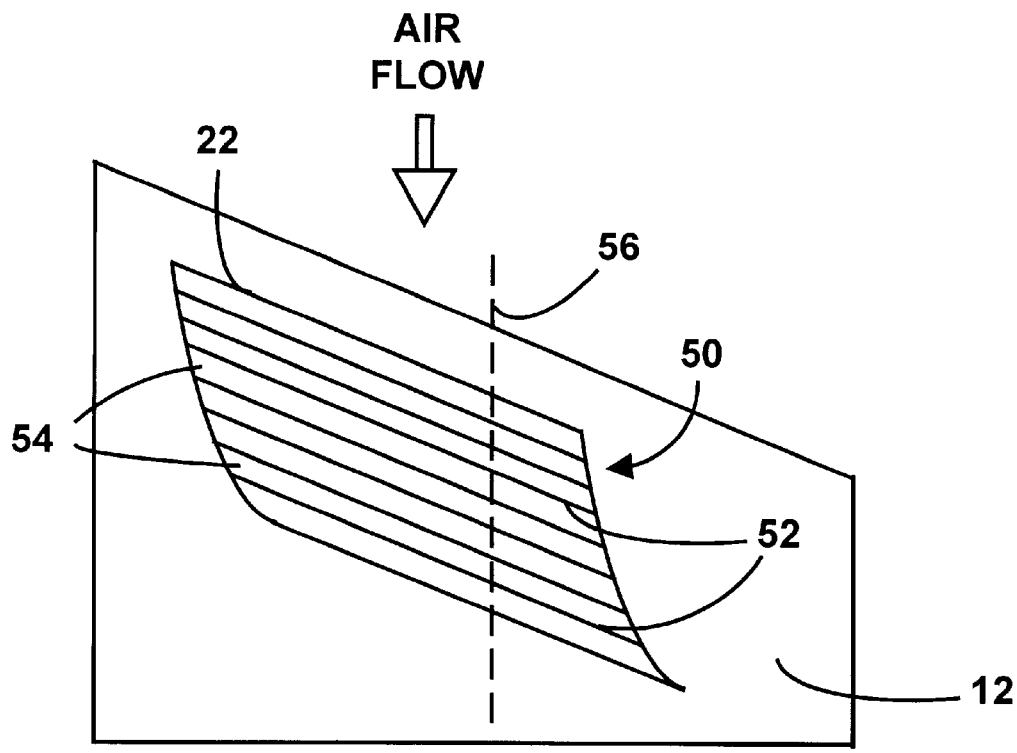
FIG. 3 is a line depiction of an oil film fringe pattern image taken during the test illustrated in FIG. 1.

FIG. 3 is a line depiction of the oil film fringe pattern image (or fringe patterns) 50 developed during the wind tunnel test. Bright fringes 54 form in the captured image due to constructive interference of the two reflected beams 35, 36, such that $\phi = 2\pi j$, where j is an integer equal to 0, 1, 2, . . . Dark fringes 52 form in the captured image due to destructive interference of the two reflected beams 35, 36, such that $\phi = 2(j+1)\pi$.

Conventional fringe analysis would result in the measurement of the phase difference and the deduction of oil film thickness at only those locations where a bright fringe 52 or a dark fringe 54 forms. However, using the instrument 10 of the present invention it is now possible to determine the phase difference and oil film thickness at each pixel of the captured image as a continuous and smoothly varying function over the entire region covered by the oil film 22.

A first image of the fringe pattern 50 is captured by the camera 33 at time $t_1$, and is analyzed by the computer 20 by means of a phase object Hilbert transform process herein adapted for 2D image analysis purposes which enables the determination of phase, $\phi(x, z, t_1)$, and therefrom the oil film thickness, $h(x, z, t_1)$, at each pixel of the fringe pattern 50. A second image of the fringe pattern 50 is captured at time $t_2$ and is analyzed by the computer 20 also by means of a phase object Hilbert transform process which enables the determination of phase, $\phi(x, z, t_2)$, and therefrom the oil film thickness, $h(x, z, t_2)$, at each pixel of the fringe pattern 50.

Figure 4:
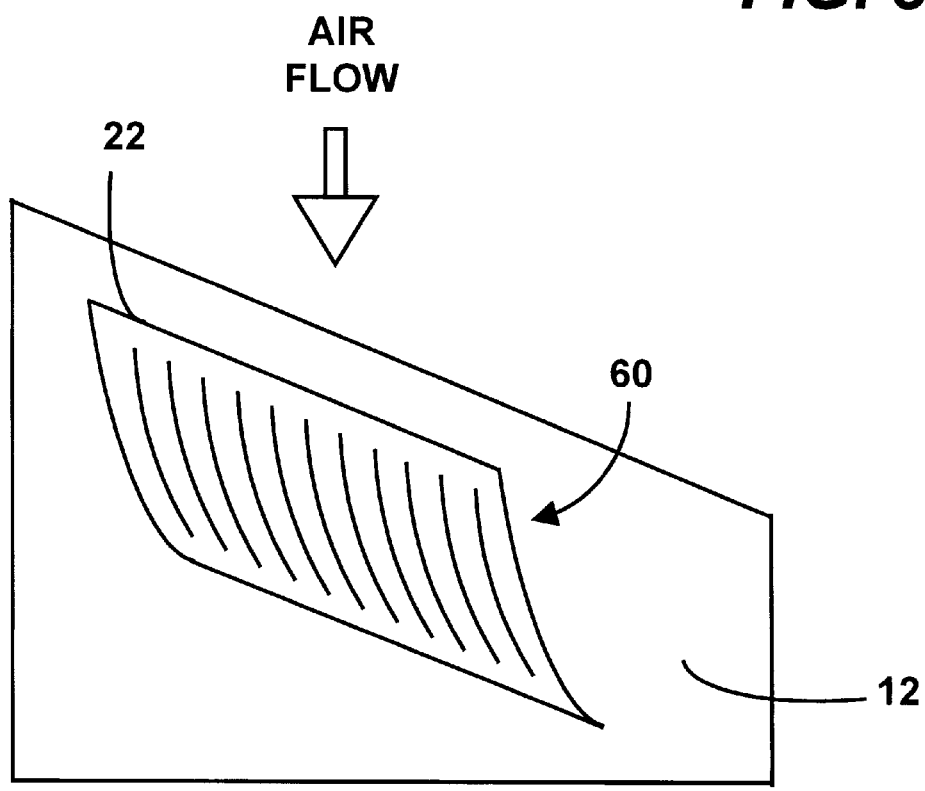
FIG. 4 is a line depiction of the surface streamline as given by a visual tracer or indicator during the test illustrated in FIG. 1.

In a preferred embodiment of the instrument 10, it is important to also determine the surface streamline direction, $\gamma(x, z)$, throughout the region of the oil film 22 being analyzed. The flow is assumed to be steady, and therefore only one image is needed. With reference to FIG. 4, visual tracers or indicators, such as drops of silicone oil doped with fluorescent dye, for instance Rhodamine B, are placed in the oil film 22 after the oil is initially wiped onto the test surface 12. As the oil flows, the fluorescent drops elongate in the direction of the local oil flow, thereby providing a visual indication of the direction of the local wall shear stress vector in the form of a streamline pattern 60.

The fluorescent dye is excited by the light source and re-emits at a longer wavelength. By placing a suitable filter on the camera 33 after the second or last fringe image is taken, an image of the surface streamline pattern 60 may be obtained. Alternatively, a second camera 39 may be used to acquire the image of the streamline pattern 60. The use of the second camera 39 would be preferable for those types of visual tracers which require a time exposure during the run. Suitable interpolation of the flow direction, $\gamma(x, z)$ onto various points of the oil film 22 may be accomplished using standard numerical analysis techniques. It should be understood that alternate techniques for determining the surface streamline direction may be used.

Figure 5A:
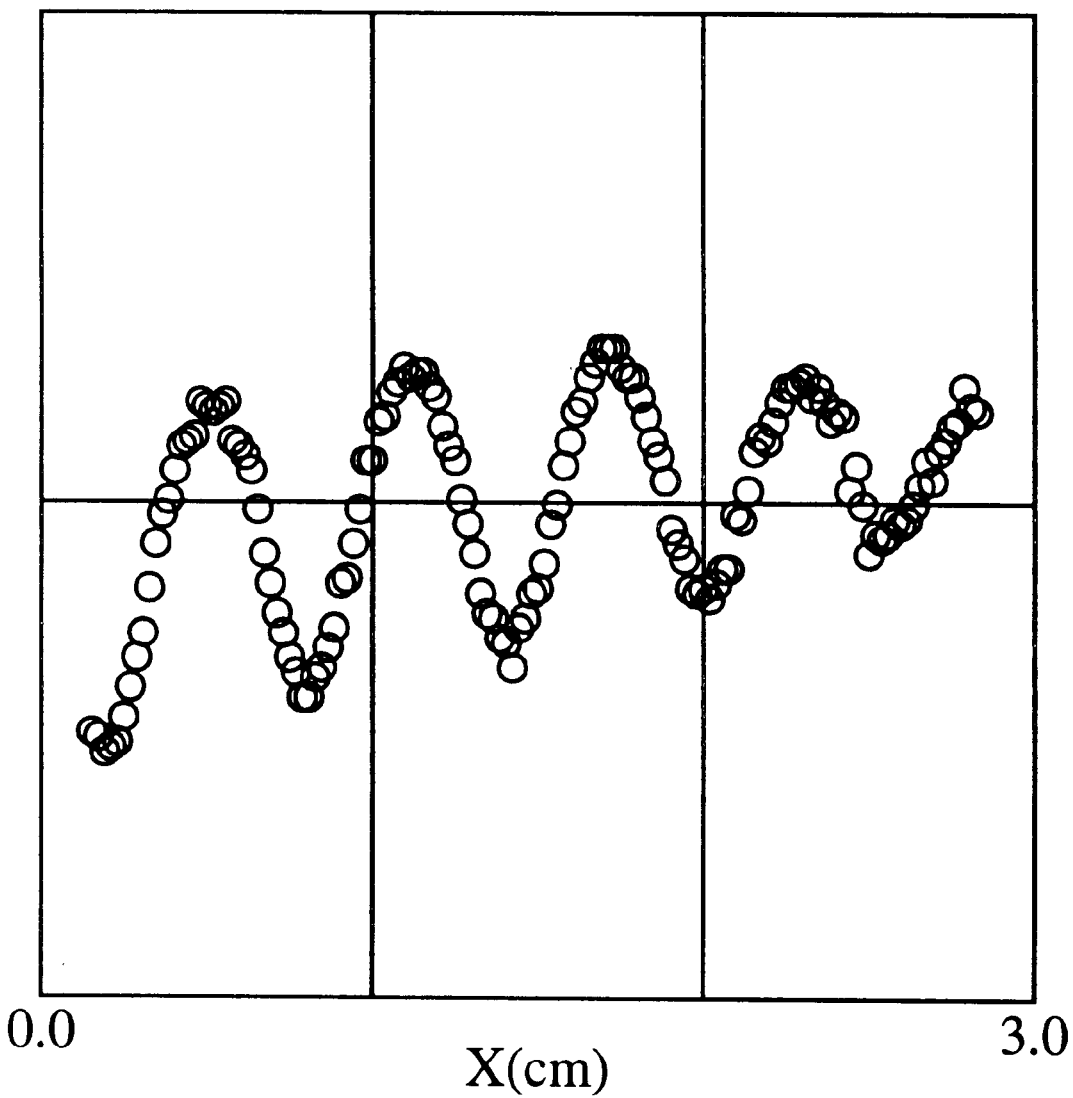
FIGS. 5a through 5e depict the progression of the Hilbert Transform analysis for oil film height from the fringe pattern image of FIG. 3, where.
Figure 5B:
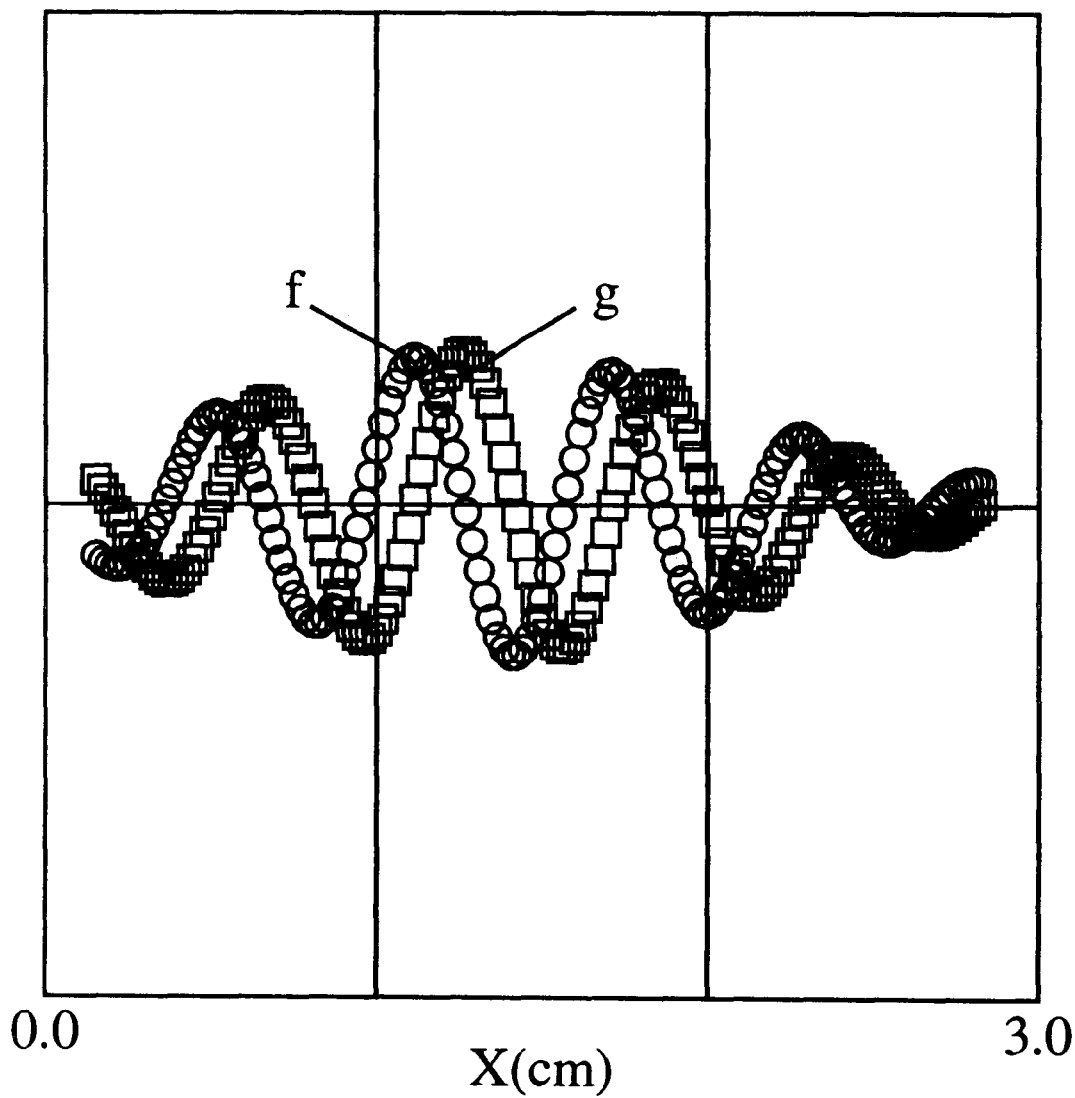

In a preferred embodiment of the instrument 10, the oil film thickness is deduced from a fringe pattern image using a phase object Hilbert transform method, herein described. Considering the light intensity recorded in the fringe pattern image of FIG. 3, along line 56 which is chosen so as to cut across the fringes. A typical light intensity variation along such line 56 is given in FIG. 5a, and may be depicted by the finite series: ($e_i$, i=1, n), where $e_i$ is the light intensity at the ith pixel along line 56. This finite series is composed entirely of real values. The Discrete Fourier Transform is applied to this finite series, with the resultant Fourier Transformed series suitably bandpass filtered in the frequency domain. The Discrete Inverse Fourier Transform is then applied to this filtered Fourier Transform series giving the bandpass filtered version of the original finite series, depicted in FIG. 5b: ($f_i$, i=1, n). The Discrete Hilbert Transform (see Bendat, J. S. and Piersol, A. G. "Random Data: Analysis and Measurement Procedures" 2nd Edition, John Wiley and Sons, New York, 1986, pp 484–516) of this filtered finite series, also depicted in FIG. 5b, is also real, and may be obtained from the filtered Fourier Transform series and is given by: ($g_i$, i=1,n).

Figure 5C:
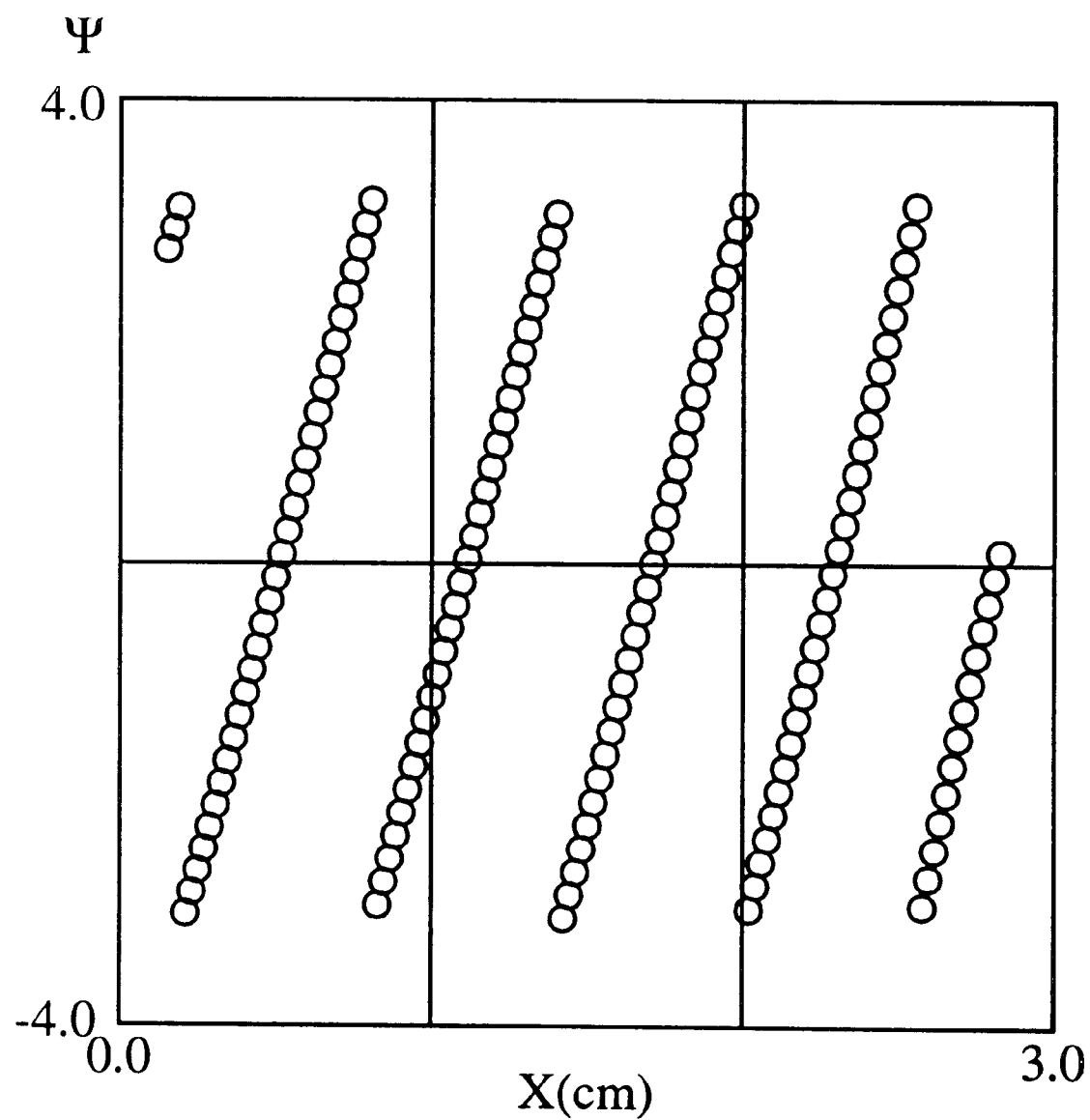
Figure 5D:
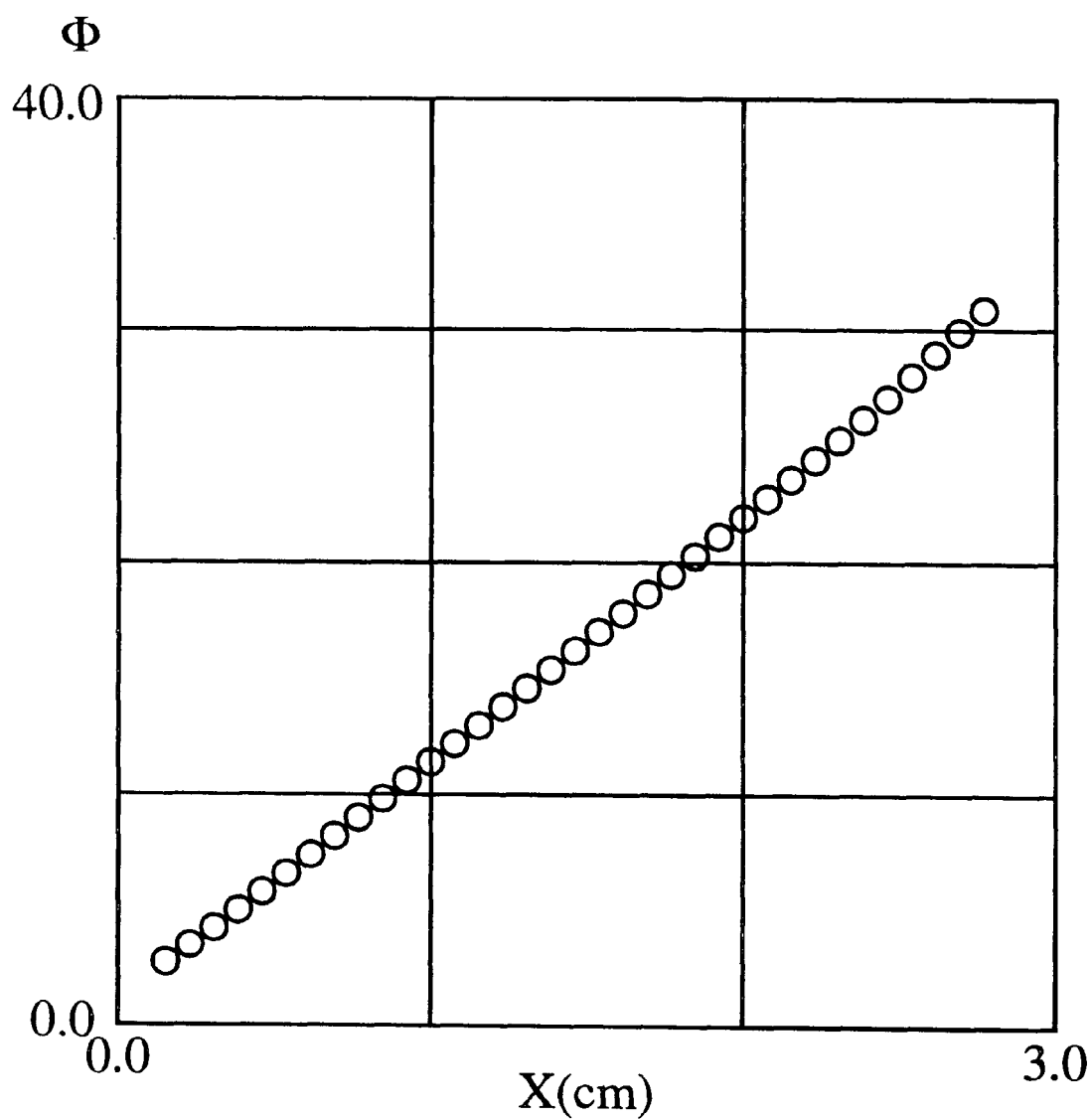
Figure 5E:
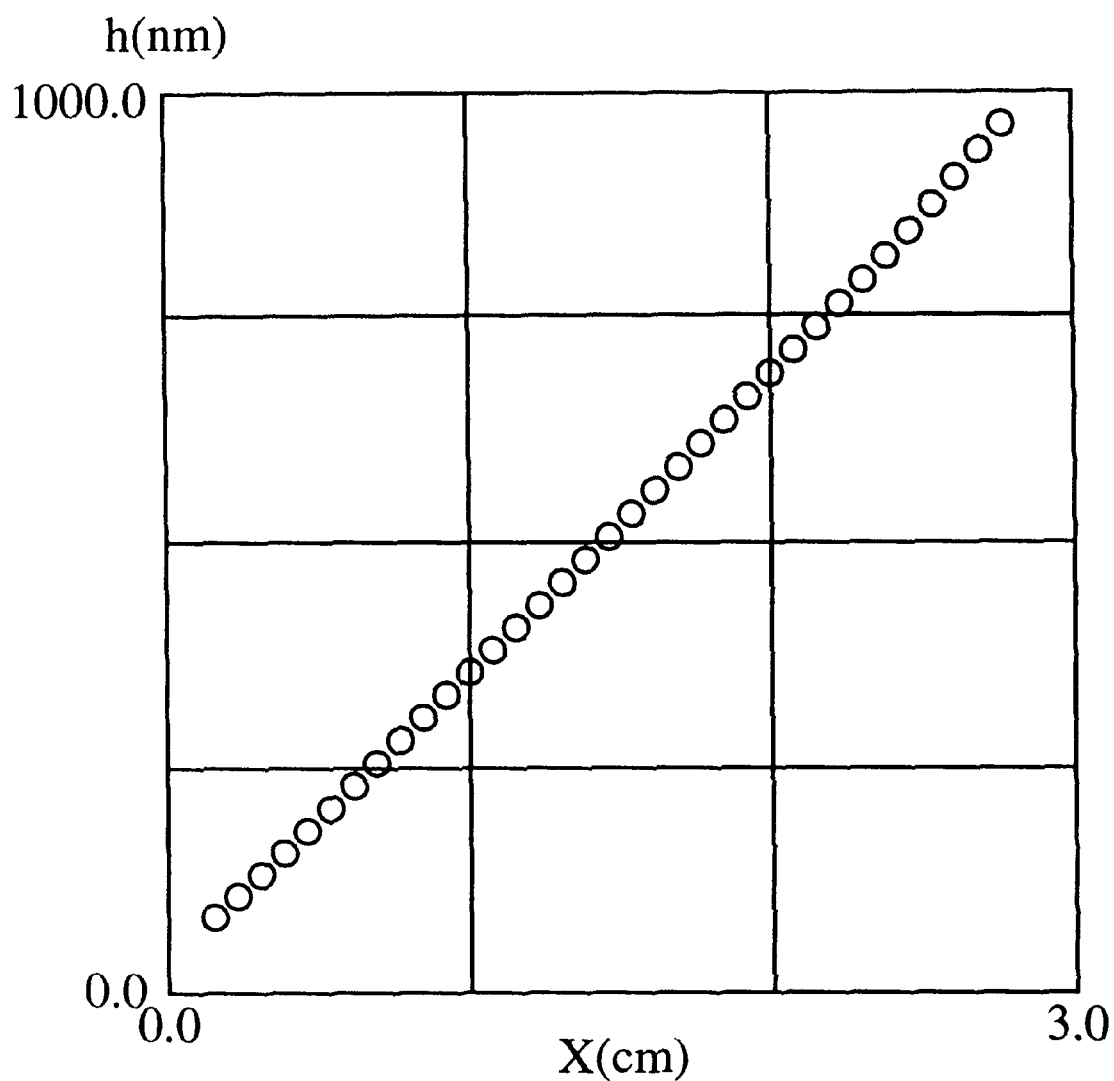

The phase variation along line 56, depicted in FIG. 5c, is then given by the following relation: $\psi_i = \arctan(g_i/f_i)$, where i=1, n. This phase variation includes discrete phase jumps of $2\pi$, which need to be resolved. These phase jumps occur due to the properties of the arctan function which determines the phase only to within $+/- 2j\pi$, where j is an unknown integer. Since line 56 is chosen so the film thickness is known to increase along the length of the line 56 (from knowledge of the surface streamline direction), each phase jump depicted in FIG. 5c, is then resolved as being $+2\pi$, giving the unwrapped phase variation, $\Phi_i$, depicted in FIG. 5e. Since the oil film thickness at the leading edge of the oil film 22 is zero, the phase jump ambiguity at the leading edge region of the oil film 22 is resolved with a zero phase jump, j=0. This unwrapped phase variation then provides the film thickness variation along line 56, depicted in FIG. 5f, according to the following relation (for the case where the camera view is at an angle $\theta$ to the surface normal):

$$h_i = \Phi_i (\lambda / 4\, \pi (n_0^2 - (n_{air} \sin\theta)^2)^{1/2}), \text{ where } i=1,n$$

Each location of the oil film 22 for which oil film thickness is desired can be analyzed by a suitable choice of analysis line 56, and the phase object Hilbert Transform method described. Clearly observed is that the phase and thus oil film thickness is resolved as a continuous smoothly varying function at each desired location rather than previous methods which merely determined the oil film thickness at those locations where a dark or bright fringe occurs.

The foregoing analysis of the phase object Hilbert Transform method may be extended to more difficult cases.

Once the thickness of the oil film 22 for at least two images have been determined, $h(x, z, t_1)$ and $h(x, z, t_2)$, and the flow direction, $\gamma(x, z)$ has also been determined, then calculation for the wall shear stress variation, ($\tau_x(x,z)$ and $\tau_z(x,z)$), can be proceed for that area of both images where the instrument 10 has recorded fringe images. This is accomplished by an inverse solution of the thin oil film equations.

The solution of the thin oil film equations is carried out according to the teaching of the present invention, and will be explained herein. Thin oil films have been traditionally used in oil-flow visualization studies to determine surface streamline direction. Since the results of such studies are mainly qualitative, detailed analysis of a thin oil film has received but minor attention to date. Previous solutions for thin oil films have been primarily limited to self-similar solutions, one of which provides the basis for the laser-interferometric skin friction (LISF) instrument of Tanner and Blows. However, advances in computational techniques have allowed for the solution of the three-dimensional Navier-Stokes equations for a wide variety of conditions of interest to the aerodynamic community.

The present instrument 10 utilizes a unique adaptation of these advanced computational techniques to provide a general solution procedure to the oil film equations. During operation of the instrument 10, the oil film 22, typically only several microns in thickness, is applied to the test surface 12. A three-dimensional aerodynamic flow over this test surface generates the wall shear-stress distribution ($\tau_x$(x,z) and $\tau_z$(x, z)) and the wall static-pressure distribution P(x,z) that are imposed on the thin oil film 22. The fluid velocity at the air/oil interface 51 is quite low (approximately 100 microns/sec), and thus the non-slip surface condition experienced by the external flow is but mildly altered.

The governing partial differential equation that describes the response of this thin film of oil on a two-dimensional surface, (x,z), to the externally applied three-dimensional aerodynamic flow is given by the following equation (3)

$$\frac{\partial h}{\partial t} + \frac{\partial}{\partial x}\left\{\frac{\tau_x h^2}{2\mu} - \left(\frac{\partial p}{\partial x} - \rho g_x\right)\frac{h^3}{3\mu}\right\} + \\ \frac{\partial}{\partial z}\left\{\frac{\tau_z h^2}{2\mu} - \left(\frac{\partial p}{\partial z} - \rho g_z\right)\frac{h^3}{3\mu}\right\} = 0, \quad (3)$$

where $\mu$ is the local oil dynamic viscosity, t is time, $\rho$ is the oil density, and $g_x$ and $g_z$ are the components of gravity in the x- and z-directions. The foregoing equation (3) is referred to as the thin oil film equation.

The foregoing thin oil film equation (Equation 3) may be derived either as a simplification of the Navier-Stokes equations or from the viewpoint of conservation of oil mass within a control volume that extends the thickness of the oil film h. Conservation of mass for this thin oil film yields the following equation (4):

$$\frac{\partial h}{\partial t} + \frac{\partial}{\partial x}\{U_c h\} + \frac{\partial}{\partial z}\{W_c h\} = 0, \quad (4)$$

where $U_c$ and $W_c$ are the x and z components of the convective oil velocity averaged over the thickness of the oil film 22. The effective Reynolds number within the oil film 22 is of the order $10^{-8}$, and the flow within the oil film 22 is clearly laminar.

Further, as with Stokes flow, the convective terms in the x- and z-momentum equations may be ignored. Integration of the simplified x- and z-momentum equation across the oil film 22 then results in the velocity profiles, u(y) and w(y), where y is the coordinate normal to the surface. These oil velocity profiles then may be integrated to give the average convective velocity of the oil film 22, as expressed by the following equations (5) and (6):

$$U_c = \frac{\tau_x h}{2\mu} - \left(\frac{\partial p}{\partial x} - \rho g_x\right)\frac{h^2}{3\mu}, \quad (5)$$

$$W_c = \frac{\tau_z h}{2\mu} - \left(\frac{\partial p}{\partial x} - \rho g_z\right)\frac{h^2}{3\mu}. \quad (6)$$

Substituting Equations 5 and 6 into Equation 4 yields the thin oil film equation (Equation 3), which includes the effect of wall shear stress, wall static pressure and gravity on the oil film.

The thin oil film equation is non-linear, but it is first-order and hyperbolic with the convective film velocity ($U_C, W_C$) giving the direction of propagation of information. The hyperbolic nature of the thin oil film equation (Equation 3) greatly simplifies the solution procedure.

Tanner, L. H. and Blows, L. G., "A Study of the Motion of Oil Films on Surfaces in Air Flow, with Application to the Measurement of Skin Friction", Journal of Physics E: Scientific Instrumentation, vol. 9, pp 194–202, 1976, give the self-similar solution, h=$\mu$x/($\tau$t), for a thin oil film subjected to a constant wall shear stress $\tau$. Knowing h as a function of t, the shear stress, $\tau$, can be found. The LISF instrument is based on this self-similar solution, which can be shown to satisfy the thin oil film equation (Equation 3), for the restricted set of conditions of one dimensional (iD) flow and constant shear stress.

Tanner, L. H. and Blows, L. G., "A Study of the Motion of Oil Films on Surfaces in Air Flow, with Application to the Measurement of Skin Friction", Journal of Physics E: Scientific Instrumentation, vol. 9, pp 194–202, 1976, also give a self-similar solution for a thin film subject to gravity, $h^2=\mu x/\rho g_x t$, which also can also be shown to satisfy Equation 3.

A "direct" or analysis solver and an "inverse" solver were developed according to the present invention for the thin oil film equation. Both solvers are for the three-dimensional problem and use "quasi"-2nd-order accurate implicit, non-iterative algorithms. For the direct thin oil film solver, the shear stress ($\tau_x$(x,z), $\tau_z$(x,z)) and the pressure field P(x,z) from the external three-dimensional aerodynamic flow are assumed known and the oil thickness variation with time, h(x,z,t>0) is calculated. Boundary conditions associated with a direct solution are as follows:

Given: h(x,z,t=0);
h(x=0,z,t>0)=0, h(x,z=t>0)=0;
$\tau_x$(x,z), $\tau_z$(x,z), p(x,z)
Solve: h(x,z,t>0).

As a check on the direct solver, numerical solutions for large times were calculated for the case with a constant non-zero value for $\tau_x$ and a zero value for $\tau_z$. The solutions were found to be consistent, to within truncation error, with the self-similar solution, h=$\mu$x/($\tau$t). The output from the direct solver can also be used as the input to the inverse solver to check for coding errors and solution consistency.

It is a preferred embodiment of the present instrument 10 to use the inverse solver. The inverse solver for the thin oil film equation addresses the instrumentation problem, where the height or thickness of the oil film 22 is known at two different times, $t_1$ and $t_2$, along with the surface streamline direction, $\gamma$. It is therefore desired to deduce the wall shear-stress distribution over the test surface 12. The boundary conditions associated with the inverse solution are as follows:

Given: h(x,z,t=$t_1$); h(x,z,t=$t_2$); $\gamma$(x,z),
Solve: $\tau_x$(x,z), $\tau_z$(x,z).

The pressure is not typically needed since the pressure-gradient term in Equation 3 is multiplied by $h^3$, whereas the shear stress is multiplied by $h^2$. For a small h, the only place that this pressure-gradient term will have a significant effect is in regions with very high pressure gradients (such as shocks) or very low shear (such as near stagnation points). A known pressure field, however, can readily be incorporated into the inverse solver. To develop the inverse solver algorithm, the thin oil film equation 3 is integrated over the time interval ($t_1,t_2$), pursuant to Equation (7):

$$(h_2 - h_1) + \frac{\partial}{\partial x}\left(\frac{\tau_x}{2\mu}\int_{t_1}^{t_2} h^2 \, dt\right) + \frac{\partial}{\partial z}\left(\frac{\tau_z}{2\mu}\int_{t_1}^{t_2} h^2 \, dt\right) \quad (7)$$

The pressure gradient and gravity terms are not included in order to simplify the description of the method, but these terms may be included in the actual solver. The integral is approximated by the quadrature, as expressed by the following Equation (8):

$$\int_{t_1}^{t_2} h^2 \, dt \approx h_1 h_2 \Delta t, \tag{8}$$

where $h_1$ and $h_2$ represent the oil thickness at times $t_1$ and $t_2$, respectively.

This quadrature is not formally 2nd-order accurate with time; however, it is satisfied by the self-similar solution, where h is proportional to $r^1$. In practice, much of the oil film 22 will be subjected to a nearly constant wall shear stress with the oil film thickness varying nearly as the self-similar solution, and thus usage of this quadrature for the integral improves achieved practical accuracy. The quadrature may be thought of as 2nd-order accurate in terms of $r^{-1}$, which is consistent with the self-similar solution. This approximation for the integral yields the following equation (9):

$$(h_2 - h_1) + \frac{\partial}{\partial x}\left(\frac{\tau_x}{2\mu} h_1 h_2 \Delta t\right) + \frac{\partial}{\partial z}\left(\frac{\tau_z}{2\mu} h_1 h_2 \Delta t\right) = 0. \tag{9}$$

For the case where the oil flows from nodes at (i-1,j) and (i,j-1) towards (i,j) at a velocity $(U_c, W_c)$, the spatial differences are formed according to the following equation (10):

$$(h_2 - h_1)_{i,j} + \left[\left(\frac{\tau \cos(\gamma)}{2\mu} h_1 h_2 \Delta t\right)_{i,j} - \left(\frac{\tau \cos(\gamma)}{2\mu} h_1 h_2 \Delta t\right)_{i-1,j}\right]\frac{1}{\Delta x} + \tag{10}$$

$$\left[\left(\frac{\tau \sin(\gamma)}{2\mu} h_1 h_2 \Delta t\right)_{i,j} - \left(\frac{\tau \sin(\gamma)}{2\mu} h_1 h_2 \Delta t\right)_{i,j-1}\right]\frac{1}{\Delta z} = 0.$$

First order spatial differences are used for the example, but those used in the actual solver are second order.

Equation (10) can now be rearranged to solve for either $h_{2,ij}$ at the new time level $t_2$ in the direct solver, or to solve for $\tau_{i,j}$ in the inverse solver. Note that both the direct and the inverse solvers are non-iterative. For the inverse solver, this rearrangement leads to the following equation (11):

$$\tau_{i,j} = \left[\frac{(h_1 - h_2)_{i,j}}{\Delta t} + \left(\frac{\tau h_1 h_2 \cos(\gamma)}{2\mu \Delta x}\right)_{i-1,j} + \left(\frac{\tau h_1 h_2 \sin(\gamma)}{2\mu \Delta z}\right)_{i,j-1}\right] / \tag{11}$$

$$\left[\frac{h_1 h_2}{2\mu}\left(\frac{\cos(\gamma)}{\Delta x} + \frac{\sin(\gamma)}{\Delta z}\right)\right]_{i,j}.$$

Since all terms in Equation (11) are positive, there is no undesirable differencing of large values that can lead to amplification of error when analyzing data. Due to the hyperbolic nature of the equation, this upwind algorithm is highly stable. For the direct solver, the convective velocity limits the time increment for reasons of accuracy rather than stability.

At the boundaries of the integration domain, a suitable starting condition can be derived by applying the self-similar solution locally at the leading edge 26. Symmetry of the flow can also be exploited where applicable.

The advantage of the inverse solution of the thin oil film equations developed herein, over the conventional use of the similarity analysis, involves the restricted validity for the similarity solution. The similarity solution given by Tanner and Blows above is valid only for one-dimensional, constant shear stress, steady conditions. The use of the similarity solution for two-dimensional oil flow with spatially varying shear stress introduces significant error, not present when solving the present thin oil film equations.

The new instrument 10 is a combination of a technique to determine the thickness of an applied oil film 22, a technique to determine the surface streamline direction, a technique to analyze the combination of the oil-film thickness at two or more times with the surface streamline direction to determine the wall shear stress vector, $(\tau_x(x,z), \tau_z(x,z))$, throughout the common region for the two images for which the oil film thickness and surface streamline direction could be determined. The present technique provides for the determination of wall shear stress vector for an extensive portion of a test surface 12 under a 3D aerodynamic flow in a single wind tunnel run. Conventional instruments provide only determination of a one component of the wall shear stress vector either at a single point or along a line. The contribution of the present invention enable the realization of capabilities not previously realized by the conventional instruments.

According to another embodiment of the present invention, the optical assembly 18 acquires only a single image of the oil film 22, preferably at or after the completion of the test run (i.e., when the three-dimensional flow is no longer applied). The image is then analyzed for oil film thickness, and an initial oil film thickness is assumed for the purposes of approximate analysis for wall shear stress vector over the region covered by the oil film 22.

According to yet another embodiment of the present invention, a fluorescent dye is added to the entire oil film 22. The oil film 22 is illuminated by a light of wavelength chosen to excite the fluorescent dye. One or more images (i.e., two images) of the oil film 22 are acquired by suitably high-pass optical filtered photographic or electronic means at different times of the oil film flow and analyzed for the oil film thickness, $h(x,z)$, by a relationship of oil film thickness to the intensity of the fluorescent oil light emission. If only a single image is acquired, then it is preferably taken at or after the completion of the test run. Surface streamlines are acquired simultaneously by embedded oil dots, wherein the oil in the oil dots (i.e., visual tracers or indicators) is either clear (without fluorescent dye) or contains an opaque dye. The oil film thickness is then combined with the surface streamline information and used as described above to obtain the applied wall shear stress vector on the test surface bounding the applied 3D aerodynamic flow by means of an inverse thin oil film solver algorithm.

According to still another embodiment, there is disclosed an instrument and a method for measuring wall shear stress vector on a surface as a consequence of an applied three-dimensional flow. A film of viscous material is dispensed and caused to flow on the surface and contains a fluorescent dye. The instrument includes a fluorescent optical assembly that causes fluorescence in the film so as to obtain emitted light from the film, the intensity of which is related to the thickness of the film. An interferometer optical assembly forms optical fringe patterns in the film so as to obtain an interferometer based on a path length difference between a first light beam reflection and a second light beam reflection. The first light beam reflection is generated by the reflection of a light beam at a film/air interface, and a second light beam reflection is generated by the reflection of the light beam at a film/surface interface.

The fluorescent optical assembly further acquires at least two fluorescent images of the film intensity at different times during the times while the three-dimensional flow is applied. The fluorescent optical assembly further acquires at least one fluorescent image of the film intensity at a time when the three-dimensional flow is no longer applied. The interferometer optical assembly acquires at least one image of the optical fringe patterns in the film at a time when the three-dimensional flow is no longer applied.

A processor analyzes the fluorescent images acquired by the fluorescent optical assembly for image intensity across the film. The processor analyzes the optical fringe images acquired by the interferometer optical assembly for the film thickness across the film. The processor further analyzes the two fluorescent images acquired by the fluorescent optical assembly for the film thickness, using the film thickness obtained from the processor, and the fluorescent light intensity obtained from the processor, to calibrate two fluorescent images acquired by the fluorescent optical assembly for fluorescent intensity versus film thickness.

The optical assembly acquires surface streamline information of the film flow, and the processor analyzes a combination of the film thickness and the surface streamline information for the wall shear stress vector on the surface by means of an inverse thin oil film solver technique.

While specific embodiments of the surface imaging skin friction instrument have been illustrated and described in accordance with the present invention, modifications and changes of the apparatus, parameters, and composition, use and operation will become apparent to those skilled in the art, without departing from the scope of the invention. For instance, while a first order spatial accurate finite difference form has been developed for the inverse solution at a single node $(x_{i,j}, z_{i,j})$, of the thin oil equation, it should be clear to a person of ordinary skill in the art that second and higher order forms may be developed using numerical analysis techniques. Also, although the fluids referred to herein are oil and air, any fluids which do not mix may be used where the film fluid is of much greater viscosity than the fluid of the applied three-dimensional flow. Further, although the preferred embodiment is to acquire surface streamline pattern information simultaneous with the film thickness information, operation of the instrument may also be accomplished with the surface streamline patterns being acquired during a separate run.

What is claimed is:

1. A method for measuring wall shear stress vector on a surface as a consequence of an applied three-dimensional flow, comprising:
   a. spreading a film of viscous material on the surface;
   b. causing said film to flow onto the surface;
   c. forming optical fringe patterns in said film by means of an optical assembly so as to obtain an interferometer based on a path length difference between a first light beam reflection and a second light beam reflection, said first light beam reflection being generated by the reflection of a light beam at a film/air interface, and said second light beam reflection being generated by the reflection of said light beam at a film/surface interface;
   d. acquiring at least two images of said optical fringe patterns at different times;
   e. analyzing said at least two images for film thickness, by means of a phase object transform method;
   f. acquiring surface streamline information of the film flow by means of tracers; and
   g. analyzing a combination of said film thickness and said surface streamline information from said at least two images for the wall shear stress vector on the surface by means of an inverse thin oil film solver technique.

2. The method according to claim 1, wherein said step of spreading includes spreading a thin film of oil.

3. The method according to claim 2, wherein said step of spreading said thin film of oil includes spreading a thin film of oil which is calibrated for dynamic viscosity versus temperature.

4. The method according to claim 1, wherein said step of analyzing said at least two images for film thickness includes analyzing using a phase object Hilbert algorithm.

5. The method according to claim 1, wherein said step of acquiring surface streamline information includes embedding fluorescent oil dots within said film.

6. The method according to claim 1, wherein said step of analyzing said combination of said film thickness and said surface streamline information includes using the following equation:

$$\tau_{i,j} = \left[ \frac{(h_1 - h_2)_{i,j}}{\Delta t} + \left( \frac{\tau h_1 h_2 \cos(\gamma)}{2\mu \Delta x} \right)_{i-1,j} + \left( \frac{\tau h_1 h_2 \sin(\gamma)}{2\mu \Delta z} \right)_{i,j-1} \right] / \left[ \frac{h_1 h_2}{2\mu} \left( \frac{\cos(\gamma)}{\Delta x} + \frac{\sin(\gamma)}{\Delta z} \right) \right]_{i,j},$$

where $\tau$ is the shear stress, $\gamma$ is the surface streamline angle, $h_1$ is the film thickness at time $t_1$, $h_2$ is the film thickness at time $t_2$, $\mu$ is the dynamic viscosity of the viscous film 22, and the subscripts i, j refer to the properties evaluated at the node i,j.

7. The method according to claim 1, wherein said step of forming optical fringe patterns includes using a monochrome light with coherence length greater than an anticipated thickness of said film.

8. The method according to claim 1, wherein said step of forming optical fringe patterns includes using a light source with discrete optical spectral lines.

9. The method according to claim 1, wherein said step of forming optical fringe patterns includes using a laser beam.

10. The method according to claim 1, wherein the three-dimensional flow is a flow of a first fluid;
   wherein said film of viscous material is composed, at least in part, of a second fluid;
   wherein said second fluid does not mix readily with said first fluid;
   wherein said second fluid has a greater viscosity than that of said first fluid; and
   wherein said second fluid has a different optical index of refraction than that of said first fluid.

11. A method for measuring wall shear stress vector on a surface as a consequence of an applied three-dimensional flow, comprising:
   a. adding a fluorescent dye to a film of viscous material on the surface, and spreading said film on the surface;
   b. causing said film to flow onto the surface;
   c. causing said film to fluoresce by illuminating said film with a light having a wavelength capable of exciting said fluorescent dye;
   d. acquiring at least two images of said film at different times;
   e. analyzing said at least two images for film thickness, from a relationship between the film thickness and the emission intensity of said fluorescent dye;
   f. acquiring surface streamline information of the film flow by means of tracers; and
   g. analyzing a combination of said film thickness and said surface streamline information from said at least two images for the wall shear stress vector on the surface by means of an inverse thin oil film solver technique.

12. The method according to claim 11, wherein said step of acquiring surface streamline information includes the step of embedding clear visual tracers.

13. The method according to claim 11, wherein said step of acquiring surface streamline information includes the step of embedding opaque visual tracers.

14. A method for measuring wall shear stress vector on a surface as a consequence of an applied three-dimensional flow, comprising:

a. spreading a film of viscous material on the surface;
b. causing said film to flow onto the surface;
c. forming optical fringe patterns in said film by means of an optical assembly so as to obtain an interferometer based on a path length difference between a first light beam reflection and a second light beam reflection, said first light beam reflection being generated by the reflection of a light beam at a film/air interface, and said second light beam reflection being generated by the reflection of said light beam at a film/surface interface;
d. acquiring one image of said optical fringe patterns when the three-dimensional flow is no longer applied;
e. analyzing said image for film thickness, by means of a phase object transform method;
f. acquiring surface streamline information of the film flow by means of tracers; and
g. analyzing a combination of said film thickness and said surface streamline information from said image for the wall shear stress vector on the surface by means of an inverse thin oil film solver technique, presuming an initial film thickness is assumed for the purpose of approximate analysis for the wall shear stress vector over the surface covered by said film.

15. A method for measuring wall shear stress vector on a surface as a consequence of an applied three-dimensional flow, comprising:

a. adding a fluorescent dye to a film of viscous material on the surface, and spreading said film on the surface;
b. causing said film to flow onto the surface;
c. causing said film to fluoresce by illuminating said film with a light having a wavelength capable of exciting said fluorescent dye;
d. acquiring one image of said film after the three-dimensional flow is no longer applied;
e. analyzing said one image for film thickness, from a relationship between the film thickness and the emission intensity of said fluorescent dye;
f. acquiring surface streamline information of the film flow by means of tracers; and
g. analyzing a combination of said film thickness and said surface streamline information from said one image for the wall shear stress vector on the surface by means of an inverse thin oil film solver technique, presuming an initial film thickness is assumed for the purpose of approximate analysis for the wall shear stress vector over the surface covered by said film.

16. An instrument for measuring wall shear stress vector on a surface as a consequence of an applied three-dimensional flow, with a film of viscous material dispensed and caused to flow on the surface and containing visual tracers, the instrument comprising in combination:

a. an optical assembly forming optical fringe patterns in said film so as to obtain an interferometer based on a path length difference between a first light beam reflection and a second light beam reflection, said first light beam reflection being generated by the reflection of a light beam at a film/air interface, and said second light beam reflection being generated by the reflection of said light beam at a film/surface surface interface;
b. said optical assembly further acquiring at least two images of said optical fringe patterns at different times;
c. a processor for analyzing said at least two images for film thickness, by means of a phase object transform method;
d. said optical assembly further acquiring surface streamline information of the film flow; and
e. said processor analyzing a combination of said film thickness and said surface streamline information from said at least two images for the wall shear stress vector on the surface by means of an inverse thin oil film solver technique.

17. The instrument according to claim 16, wherein said optical assembly includes a source of extended light.

18. The instrument according to claim 16, wherein said optical assembly includes a camera.

19. The instrument according to claim 16, wherein said optical assembly includes an interferometric imaging system.

20. The instrument according to claim 16, wherein said optical assembly includes a polarizing optical device.

21. The instrument according to claim 16, wherein said visual tracers include a fluorescent dye.

22. The instrument according to claim 16, wherein said visual tracers include fluorescent particles.

23. The instrument according to claim 16, wherein said visual tracers include fluorescent strings embedded randomly within said film.

24. The instrument according to claim 16, wherein said visual tracers include an opaque dye.

25. An instrument for measuring wall shear stress vector on a surface as a consequence of an applied three-dimensional flow, with a film of viscous material dispensed and caused to flow on the surface and containing a fluorescent dye, the instrument comprising in combination:

a. an optical assembly causing fluorescence in said the film so as to obtain emitted light from the film, the intensity of the emitted light being related to the thickness of the film;
b. said optical assembly further acquiring at least two images of the film intensity at different times;
c. a processor for analyzing said at least two images for film thickness from a relationship between the film thickness and the emission intensity of the fluorescent dye;
d. said optical assembly further acquiring surface streamline information of the film flow; and
e. said processor analyzing a combination of said film thickness and said surface streamline information from said at least two images for the wall shear stress vector on the surface by means of an inverse thin oil film solver technique.

26. An instrument for measuring wall shear stress vector on a surface as a consequence of an applied three-dimensional flow, with a film of viscous material dispensed and caused to flow on the surface and containing visual tracers, the instrument comprising in combination:

a. an optical assembly forming optical fringe patterns in said film so as to obtain an interferometer based on a path length difference between a first light beam reflection and a second light beam reflection, said first light beam reflection being generated by the reflection of a light beam at a film/air interface, and said second light beam reflection being generated by the reflection of said light beam at a film/surface interface;
b. said optical assembly further acquiring one image of said optical fringe patterns when the three-dimensional flow is no longer applied;

c. a processor for analyzing said image for film thickness, by means of a phase object transform method;

d. said optical assembly further acquiring surface streamline information of the film flow; and e. said processor analyzing a combination of said film thickness and said surface streamline information from said image for the wall shear stress vector on the surface by means of an inverse thin oil film solver technique and an assumed initial film thickness.

27. An instrument for measuring wall shear stress vector on a surface as a consequence of an applied three-dimensional flow, with a film of viscous material dispensed and caused to flow on the surface and containing a fluorescent dye, the instrument comprising in combination:

a. an optical assembly causing fluorescence in the film so as to obtain emitted light from the film, the intensity of said emitted light being related to the thickness of the film;

b. said optical assembly further acquiring one image of the film intensity when the three-dimensional flow is no longer applied;

c. a processor for analyzing said image for film thickness from a relationship between the film thickness and the emission intensity of the fluorescent dye;

d. said optical assembly further acquiring surface streamline information of the film flow; and e. said processor analyzing a combination of said film thickness and said surface streamline information from said image for the wall shear stress vector on the surface by means of an inverse thin oil film solver technique and an assumed film thickness.

28. An instrument for measuring wall shear stress vector on a surface as a consequence of an applied three-dimensional flow, with a film of viscous material dispensed and caused to flow on the surface and containing a fluorescent dye, the instrument comprising in combination:

a. a fluorescent optical assembly causing fluorescence in the film so as to obtain emitted light from said film, the intensity of which emitted light being related to the thickness of the film;

b. an interferometer optical assembly forming optical fringe patterns in the film so as to obtain an interferometer based on a path length difference between a first light beam reflection and a second light beam reflection, said first light beam reflection being generated by the reflection of a light beam at a film/air interface, and a second light beam reflection being generated by the reflection of said light beam at a film/surface interface;

c. said fluorescent optical assembly further acquiring at least two fluorescent images of the film intensity at different times during the times while the three-dimensional flow is applied;

d. said fluorescent optical assembly further acquiring at least one fluorescent image of the film intensity at a time when the three-dimensional flow is no longer applied;

e. said interferometer optical assembly acquiring at least one image of said optical fringe patterns in the film at a time when the three-dimensional flow is no longer applied;

f. a processor for analyzing said fluorescent images acquired by said fluorescent optical assembly for image intensity across the film;

g. said processor analyzing said optical fringe images acquired by said interferometer optical assembly for the film thickness across the film;

h. said processor analyzing said at least two fluorescent images acquired by said fluorescent optical assembly for the film thickness, using the film thickness obtained from said processor, and the fluorescent light intensity obtained from said processor, to calibrate said at least two fluorescent images acquired by said fluorescent optical assembly for fluorescent intensity versus film thickness;

i. an optical assembly for acquiring surface streamline information of the film flow; and k. said processor analyzing a combination of the film thickness and said surface streamline information for the wall shear stress vector on the surface by means of an inverse thin oil film solver technique.

29. A method for measuring wall shear stress vector on a surface as a consequence of an applied three-dimensional flow of a first fluid, comprising:

a. spreading a film of a second fluid on the surface, wherein said first and second fluid do not mix, and wherein said second fluid is of greater viscosity than the first fluid;

b. causing said film to flow onto the surface;

c. forming optical fringe patterns in said film by means of an optical assembly so as to obtain an interferometer based on a path length difference between a first light beam reflection and a second light beam reflection, said first light beam reflection being generated by the reflection of a light beam at a first fluid/film interface, and said second light beam reflection being generated by the reflection of said light beam at a film/surface interface;

d. acquiring at least two images of said optical fringe patterns at different times;

e. analyzing said at least two images for film thickness, by means of a phase object transform method;

f. acquiring surface streamline information of the film flow by means of tracers; and g. analyzing a combination of said film thickness and said surface streamline information from said at least two images for the wall shear stress vector on the surface by means of an inverse thin film solver technique.

30. A method for measuring wall shear stress vector on a surface as a consequence of an applied three-dimensional flow, comprising:

a. adding a fluorescent dye to a film of viscous material on the surface, and spreading said film on the surface;

b. causing said film to flow onto the surface;

c. causing said film to fluoresce by illuminating said film with a light beam having a wavelength capable of exciting said fluorescent dye;

d. acquiring at least two fluorescent images of said film at different times while the three-dimensional flow is being applied;

e. acquiring one fluorescent image of said film after the three-dimensional flow is no longer applied;

f. forming an optical fringe pattern in said film by means of an optical assembly so as to obtain an interferometer based on a path length difference between a first light beam reflection and a second light beam reflection, said first light beam reflection being generated by the reflection of a light beam at a film/air interface, and said second light reflection being generated by the reflection of said light beam at a film/surface interface;

g. acquiring one or more images of said optical fringe pattern when the three-dimensional flow is no longer applied;

h. analyzing said optical fringe pattern for film thickness, by means of a phase object transform method;

i. analyzing said at least two fluorescent images acquired at step (d) for film thickness, using said one or more images acquired at step (g) and said fluorescent image acquired at step (e) as a calibration reference;

j. acquiring surface streamline information of said film flow by means of tracers; and k. analyzing a combination of said film thickness and said surface streamline information from said images for the wall shear stress vector on the surface by means of an inverse thin oil film solver technique.

* * * * *